(12) United States Patent
Zhao et al.

(10) Patent No.: US 11,465,533 B2
(45) Date of Patent: Oct. 11, 2022

(54) ACCELERATION CONTROL SYSTEM FOR AN ELECTRIC VEHICLE

(71) Applicant: FORD GLOBAL TECHNOLOGIES, LLC, Dearborn, MI (US)

(72) Inventors: Yanan Zhao, Ann Arbor, MI (US); Xiaohong Nina Duan, Canton, MI (US); Jeffrey Allen Doering, Canton, MI (US); Angel Fernando Porras, Dearborn, MI (US); Jordan Mazaira, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 16/718,463

(22) Filed: Dec. 18, 2019

(65) Prior Publication Data

US 2021/0188125 A1 Jun. 24, 2021

(51) Int. Cl.
*B60L 58/26* (2019.01)
*B60L 50/64* (2019.01)
(Continued)

(52) U.S. Cl.
CPC ............ *B60L 58/26* (2019.02); *B60L 50/64* (2019.02); *H01M 10/486* (2013.01);
(Continued)

(58) Field of Classification Search
CPC ............ H02J 2310/00; H02J 2310/60; H02J 2310/50; H02J 2310/62; H02J 7/00041; H02J 7/00309; H02J 7/007192; Y02T 10/70; Y02T 10/72; B60Y 2300/00; B60Y 2300/182; B60Y 2300/67; B60Y 2300/6092; B60W 2510/00; B60W 2510/24; B60W 2510/242; B60W 2510/246; B60H 1/00; B60H 1/00278; B60L 2250/26; B60L 2250/24; B60L 2260/40; B60L 2260/50; B60L 2260/54; B60L 2260/56; B60L 58/00; B60L 58/18; B60L 58/24; B60L 58/26; B60L 2240/14; B60L 2240/545; H01M 10/60;
(Continued)

(56) References Cited

U.S. PATENT DOCUMENTS 9,987,944 B2 * 6/2018 Dunlap .................... B60L 1/02
2015/0336566 A1 11/2015 Johri et al.
(Continued)

*Primary Examiner* — Anthony R Jimenez
(74) *Attorney, Agent, or Firm* — David B Kelley; Brooks Kushman P.C.

(57) ABSTRACT

A vehicle includes an electric machine, a battery, an accelerator pedal, a battery cooling system, and a controller. The electric machine is configured to propel the vehicle. The battery is configured to provide electrical power to the electric machine. The battery cooling system is configured to cool the battery in a plurality of cooling modes. A transition between cooling modes of the battery cooling system corresponds to either an increase or a decrease in battery power being utilized to cool the battery. The controller is programmed to truncate an acceleration request under certain conditions to prevent an increase in battery power output in order to reduce a rate at which the battery temperature increases and to prevent a transition to a cooling mode that requires an increase in battery power output.

20 Claims, 8 Drawing Sheets

(51) Int. Cl.
  *H01M 10/613*  (2014.01)
  *H01M 10/625*  (2014.01)
  *H01M 10/48*  (2006.01)
  *H01M 10/6568*  (2014.01)
  *H01M 10/633*  (2014.01)

(52) U.S. Cl.
  CPC ....... *H01M 10/613* (2015.04); *H01M 10/625* (2015.04); *H01M 10/633* (2015.04); *H01M 10/6568* (2015.04); *B60L 2240/545* (2013.01); *B60L 2250/26* (2013.01); *H01M 2220/20* (2013.01)

(58) Field of Classification Search
  CPC .. H01M 10/61; H01M 10/613; H01M 10/625; H01M 10/63; H01M 10/651; H01M 10/633; H01M 10/6568; H01M 10/486; H01M 6/50; H01M 6/5038; H01M 2220/20
  USPC .......................................................... 701/22
  See application file for complete search history.

(56) References Cited

U.S. PATENT DOCUMENTS

2017/0259686 A1  9/2017  Lee
2020/0023750 A1* 1/2020  Fukami ................ B60W 20/13

\* cited by examiner

ACCELERATION CONTROL SYSTEM FOR AN ELECTRIC VEHICLE

TECHNICAL FIELD

The present disclosure relates to electric vehicles and control systems for electric vehicles.

BACKGROUND

Electric vehicles may include an electric battery that is configured to deliver electric power to an electric machine that is configured to propel the vehicle.

SUMMARY

A vehicle includes an electric machine, a battery, an accelerator pedal, a battery cooling system, and a controller. The electric machine is configured to propel the vehicle. The battery is configured to provide electrical power to the electric machine. The battery cooling system is configured to cool the battery in a plurality of cooling modes. A transition from a first mode to a second mode of the battery cooling system corresponds to an increase in battery power being utilized to cool the battery. A transition from the second mode to the first mode corresponds to a decrease in battery power being utilized to cool the battery. The controller is controller programmed to, in response to a temperature of the battery increasing from less than to greater than a first threshold, transition the battery cooling system the first cooling mode to the second cooling mode; in response to the temperature of the battery decreasing from greater than to less than the first threshold, transition the battery cooling system from the second cooling mode to the first cooling mode; receive a demanded acceleration request from the accelerator pedal while the battery cooling system is in the first cooling mode; calculate an estimated increase in battery temperature that would result from the demanded acceleration request; and in response to a sum of a current battery temperature and the estimated increase in battery temperature being greater than the first threshold, truncate the demanded acceleration request such that the temperature of the battery remains below the first threshold and the battery cooling system remains in the first cooling mode during the acceleration.

A vehicle includes an electric machine, a battery, an accelerator pedal, a battery cooling system, and a controller. The electric machine is configured to propel the vehicle. The battery is configured to provide electrical power to the electric machine. The battery cooling system is configured to cool the battery in a first cooling mode and a second cooling mode. A transition from the first mode to the second mode corresponds to an increase in battery power utilized to cool the battery. The controller is programmed to, in response to a temperature of the battery increasing from less than to greater than a first threshold, transition the battery cooling system from the first cooling mode to the second cooling mode; receive a demanded acceleration request from the accelerator pedal while the battery cooling system is in the first cooling mode; calculate a truncated acceleration request that is constrained to maintain battery temperature to less than the first threshold to prevent the battery cooling system from transitioning from the first mode to the second mode; in response to the truncated acceleration request being less than the demanded acceleration request, accelerate the vehicle according to the truncated acceleration request; and in response to the demanded acceleration request being less than the truncated acceleration request, accelerate the vehicle according to the demanded acceleration request.

A vehicle includes an electric machine, a battery, an accelerator pedal, a battery cooling system, and a controller. The electric machine is configured to propel the vehicle. The battery is configured to provide electrical power to the electric machine. The battery cooling system has a coolant circuit and pump that is configured to circulate a coolant within the coolant circuit to cool the battery. An increase in pump speed corresponds with an increase in battery cooling and an increasing battery power being utilized to cool the battery. The controller is programmed to, in response to a temperature of the battery increasing from less than to greater than a first threshold, increase pump speed from a first speed to a second speed; receive a demanded acceleration request from the accelerator pedal while the temperature of the battery is less than the first threshold and the pump is operating at the first speed; calculate an estimated increase in battery temperature that would result from the demanded acceleration request based on a battery power output required to accelerate the vehicle according to the demanded acceleration request; and in response to a sum of a current battery temperature and the estimated increase in battery temperature being greater than the first threshold, increase the power output of the battery to less than the battery power output required to accelerate the vehicle according to the demanded acceleration request such that the vehicle accelerates at a value that is less than the demanded acceleration request and such that the temperature of the battery remains below the first threshold and the pump remains operating at the first speed during, the acceleration.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
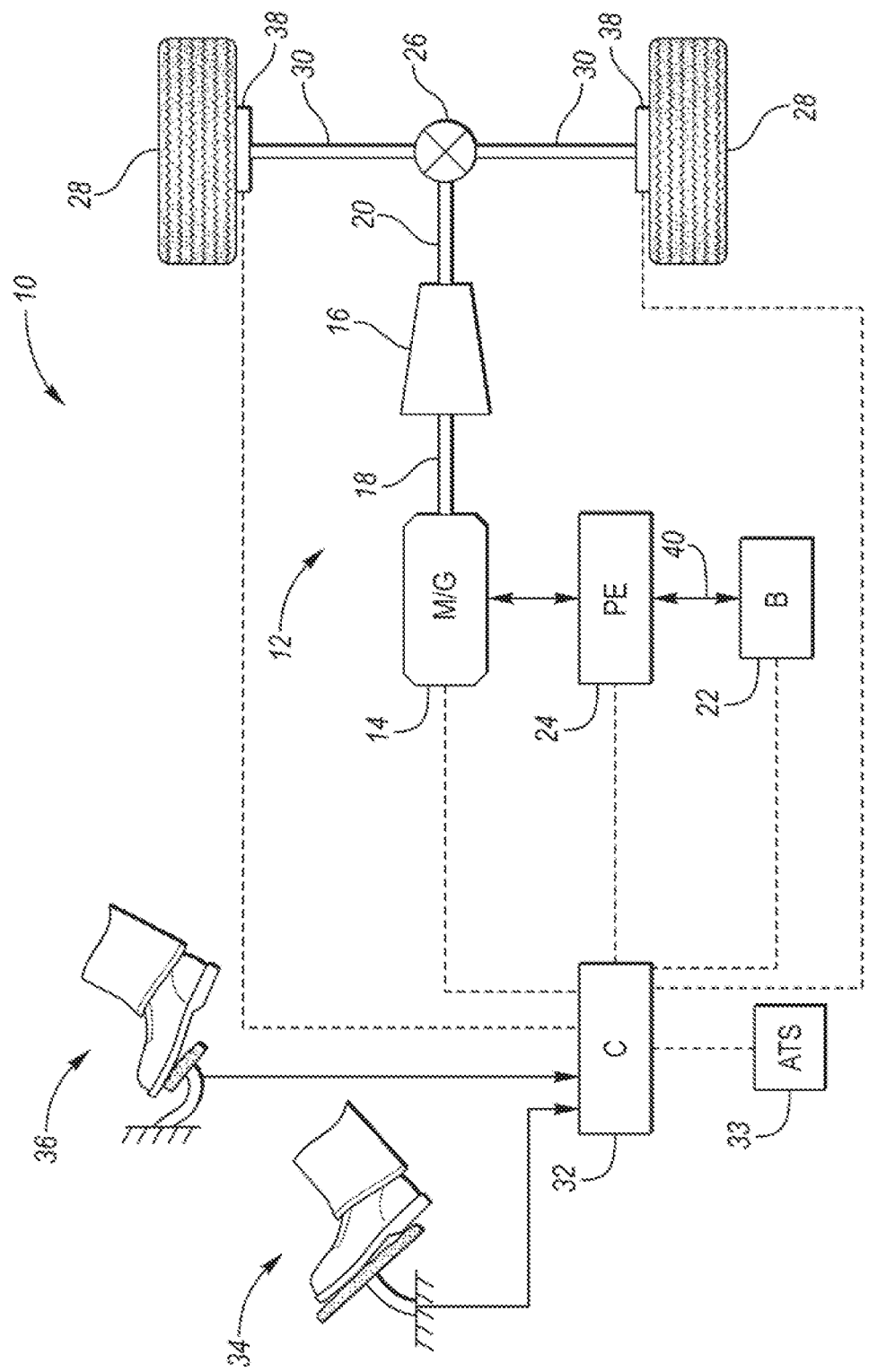
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source liar the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission. 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output Shall 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1. (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing, code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the schematic illustrated in FIG. 1 is merely representative and is not intended to be limiting. Other configurations are contemplated without deviating, from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid. vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2:
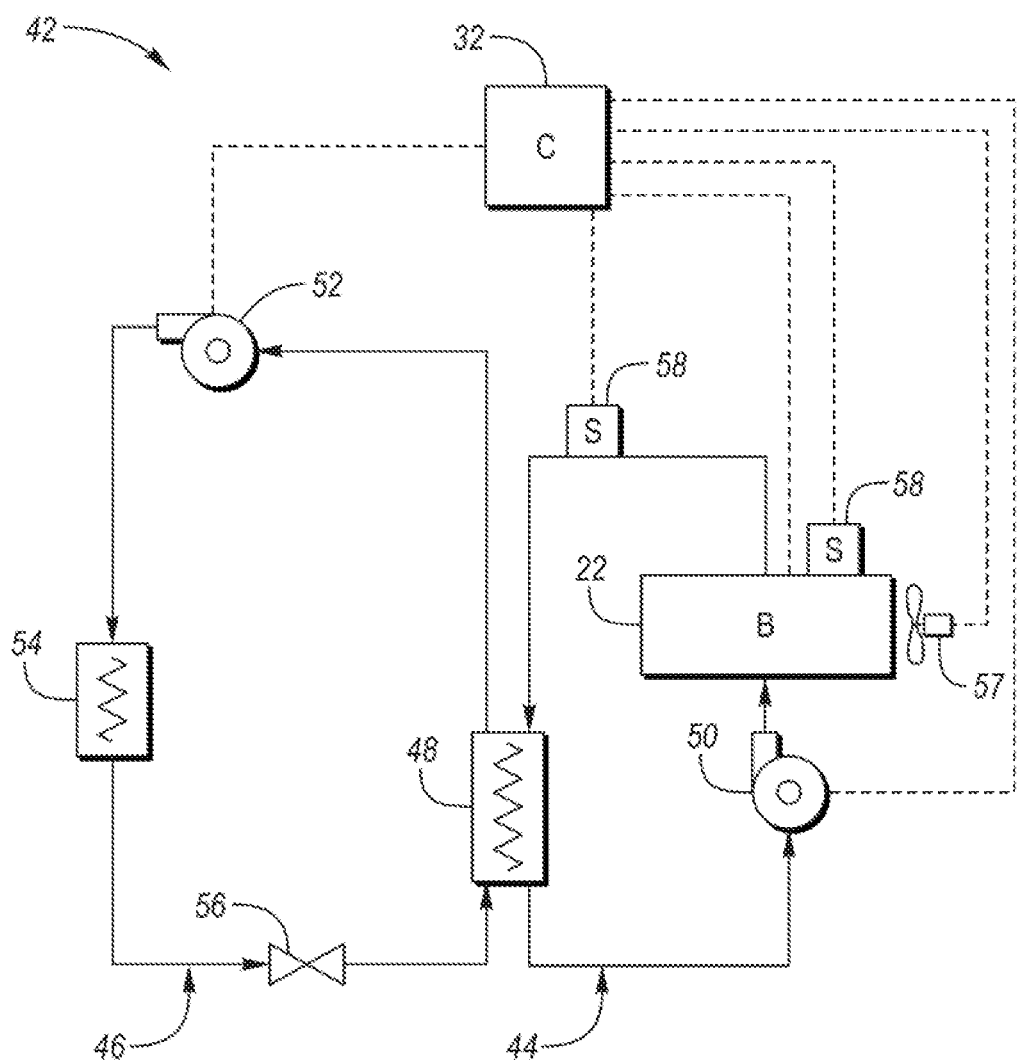
FIG. 2 is schematic illustration of a representative battery cooling system.

Referring to FIG. 2, a representative battery cooling system 42 that is configured to cool that battery 22 is illustrated. The battery cooling system 42 includes a coolant circuit or loop 44 that is configured to flow a coolant through or around the battery 22 in order to cool the battery 22. The battery cooling system 42 also includes a refrigerant circuit or loop 46 that is configured to cool the coolant within the coolant loop 44.

The coolant loop 44 is configured to circulate coolant between the battery 22 and a chiller 48 in order to cool the battery 22. Heat generated by the battery 22 is transferred to the coolant within the coolant loop 44 and is then rejected to the refrigerant loop 46 via the chiller 48. The coolant within the coolant loop 44 is supplied to the battery 22 from the chiller 48. The coolant is then flowed across (or through conduits within or adjacent to) the battery 22 in order to cool the battery 22. The coolant is then flowed from the battery 22 back to the chiller where the heat transferred from the battery 22 to the coolant is then rejected to the refrigerant loop 46. The coolant loop 44 may include a pump 50 that is configured to direct coolant from the chiller 48 to the battery 22, and from the battery 22 back to the chiller 48. The pump 50 may be powered by the battery 22 and may be in electronic communication with the controller 32. More specifically, the pump 50 may include a speed sensor, such as a resolver, that is configured to communicate a speed of an impeller of the pump 50 to the controller 32. The pump 50 may also have inlet and outlet pressure sensors that are configured to communicate the pressure of the coolant at the inlet and outlet of the pump 50 to the controller 32.

The refrigerant loop 46 includes the chiller 48, a compressor 52, a condenser 54, and a thermal expansion valve 56. Heat generated within the coolant loop 44 by the battery 22 is transferred to the refrigerant within the refrigerant loop 46 via the chiller 48. The refrigerant is then directed to the compressor 52 and then on to the condenser 54. The heat transferred to the refrigerant from the coolant loop 44 via the chiller 48 may then be transferred to the ambient air via the condenser 54. A fan (not shown) may be configured to direct the ambient air across the condenser 54. The refrigerant then returns to the thermal expansion valve 56.

The controller 32 may be programmed to circulate coolant through the coolant loop 44 alone (i.e., without the operation of the refrigerant loop 46) to cool the battery 22. When increased cooling is required, the controller 32 may be programmed to activate the refrigerant loop 46 to cool the battery 22 in conjunction with the coolant loop 44. Under certain battery temperatures, both the coolant loop 44 and refrigerant loop 46 may be both shut down. As the temperature of the battery increases, the coolant loop 44 may be first brought online alone to cool the battery 22 by turning on the pump 50. As the temperature of the battery 22 increases the speed of the pump may be increased to increase the coolant flow through the coolant loop 44, which increases cooling of the battery 22. As the temperature of the battery 22 and the coolant with the coolant loop 44 continue to increase to a point where operating the coolant loop 44 alone may not be sufficient to cool the battery 22, the refrigerant loop 46 may be activated to cool the coolant within the coolant loop 44, which ultimately increases cooling of the battery 22. The temperature of the battery 22 and the temperature of the coolant with the coolant loop 44 may be communicated to the controller 32 via sensors 58.

Reducing battery cooling energy is a key design objective for hybrid/electric vehicles, and particularly for BEVs. Extending the driving range of BEVs is desirable to customers, particularly for fleet/commercial BEVs owners, who have a desire to maximize battery single charge drive distance.

Energy efficiency of BEVs is generally expressed as Watt-hours per mile (Wh/mi). The battery (e.g., battery 22), which may be referred to as a High Voltage (HV) battery, may be the only propulsive source of a BEV. When the driver applies or depresses the accelerator pedal, the interpreted driver demand will be solely met by the HV battery. Heat generation is accompanied with battery discharging and charging, and battery cooling is required to avoid overheating the battery during driving, especially during high charge and discharge events. Therefore, part of the battery power will be used for battery thermal management to drive cooling pumps and fans. At each time instant, the total battery power being utilized, Pwr_batt, may be represented by equation (1):

$$Pwr\_batt = Pwr\_prop + Pwr\_aux \quad (1)$$

where Pwr_prop is the power being used to drive the vehicle and Pwr_aux is the auxiliary power used by controllers, lighting system, climate control system etc. on the vehicle. The power used by battery cooling system, Pwr_cooling, is also included within Pwr_aux. To have better energy efficiency, it is desired to keep Pwr_cooling small, or keep the ratio of Pwr_cooling to Pwr_prop small.

A driver's driving habit or style may have an impact on a vehicle's energy efficiency. The more aggressive the driver applies the accelerator pedal, the more aggressive the vehicle acceleration is expected. An increase in vehicle acceleration requires an increase in battery propulsive power and an increase in battery discharge current that is needed propel the vehicle, leading to a higher demand for battery discharge power and an increase in internal battery heating leading to a quicker temperature built up within the battery. Similar situations exist for autonomous BEVs, when a virtual driver is developed aggressively. During vehicle propulsion, the total power request may be clipped by the battery's discharge power limit.

Aggressive accelerator pedal application may result in multiple potential issues. The battery temperature may become higher than a battery power cut off temperature, Temp_battPwrCutOff, or a battery working temperature high limit, Temp_battHighLim. The battery working temperature high limit, Temp_battHighLim, is defined as equal to or a few degrees lower than the battery power cut off temperature, Temp_battPwrCutOff. The battery cooling system may operate in an in-efficient zone due to the heat convection coefficient increasing with an increase of a cooling power mode or level. Cooling power modes will be discussed in further detail below. A high percentage of battery power may be used for cooling the battery, rather than for vehicle propulsion. This is more of a concern when the vehicle is used in higher ambient temperatures and when there is an increase in heat transfer from a hot road surface (such as hot black asphalt) to the battery and its cooling system.

This disclosure includes a control system that determines a desired vehicle acceleration to prevent the above issues from happening. The design objectives are to increase energy efficiency of BEVs and extend the driving range per single charge of the battery, which increases the customer's satisfaction with vehicle electric range without objectionable loss of performance. For autonomous BEVs, especially for BEV automated delivery vehicles, the electric range is very important and delivery companies would be willing to reduce performance to increase range.

An intelligent acceleration truncation (IAT) mode may be included in BEVs. Once selected, and when 100% (or >a calibratable %) accelerator pedal is not applied, or a significant accelerator pedal application rate (a calibratable value) is not observed, vehicle control can optimally determine a desired vehicle acceleration, and arbitrate the desired vehicle acceleration with the acceleration derived from the driver's acceleration pedal input. If the driver's acceleration pedal input is higher than the desired vehicle acceleration, it will be truncated by the desired acceleration., An HMI interface can be designed to enable driver's selection of this mode, or the mode can be automatically entered when other related modes are selected. Another option is to have this mode enabled by the dealership, e.g., for fleet vehicles.

Figure 3A:
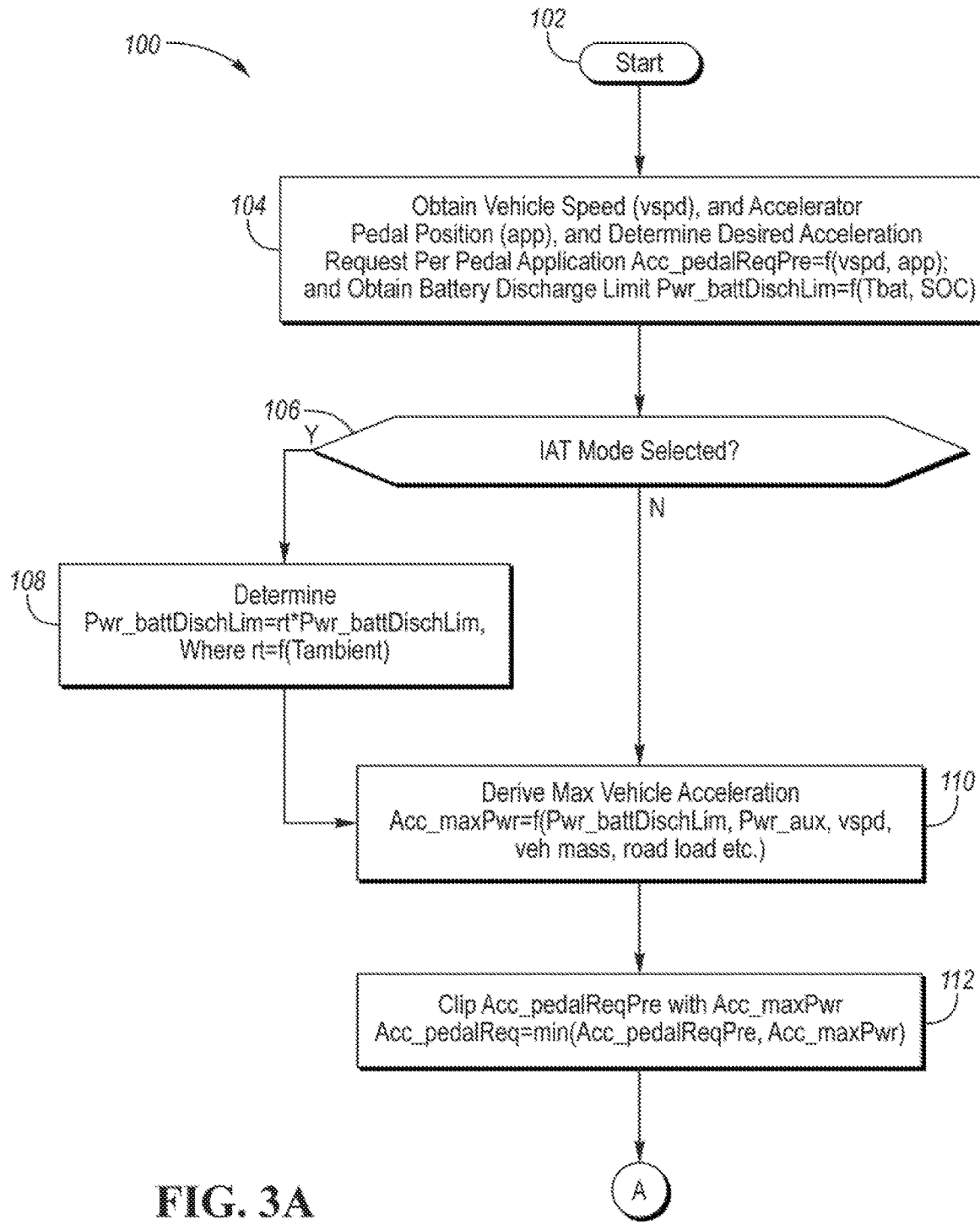
FIGS. 3A and 3B are a flowchart illustrating a method of truncating a vehicle acceleration request.
Figure 3B:
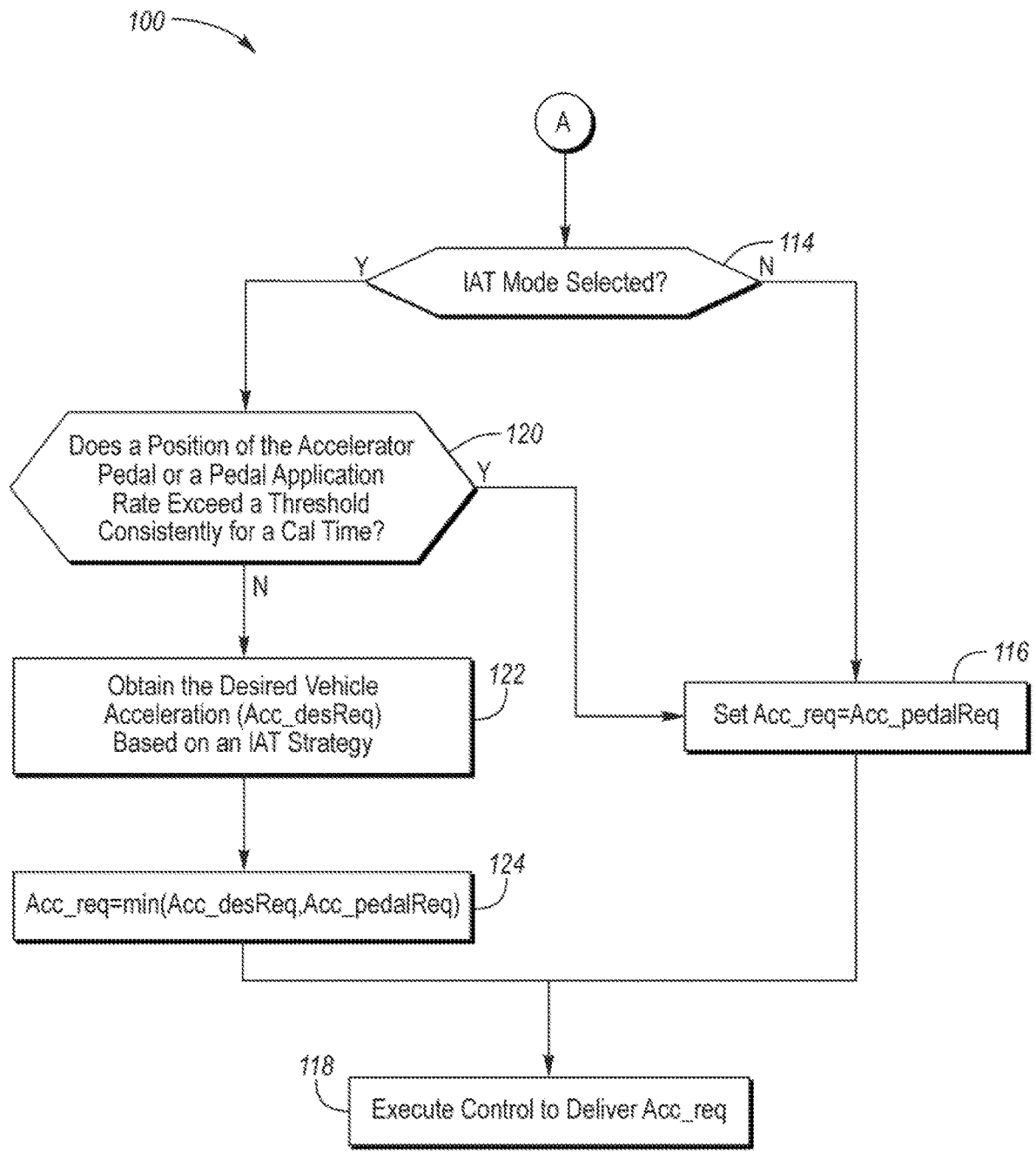

Referring to FIGS. 3A and 3B, a flowchart illustrating a method 100 of truncating a vehicle acceleration request. The method 100 may be stored as control logic and/or an algorithm within the controller 32. The method 100 is initiated at start block 102. Next, the method 100 moves on to block 104 where an initial pedal acceleration request, Acc_PedalReqPre, is obtained as a function of vehicle speed, vspd, an accelerator pedal position, app, and a battery power discharge limit, Pwr_battDischLim. The battery power discharge limit, Pwr_battDischLim, is a function of a temperature of the battery 22 and a SOC of the battery 22. Next, it is determined at block 106 if the IAT mode has been selected. If the IAT mode has been selected, the battery power discharge limit is adjusted by a ratio, rt, at block 108 which is based on ambient air temperature, where 0<rt≤1. Lower values of the ratio, rt, are used for higher ambient air temperatures and higher values of the ratio, rt, are used for lower ambient air temperatures. This adjustment assists in controlling battery working temperature to within a desirable range, especially when vehicle is operating under high ambient air temperatures.

After block 108 or after block 106 if the IAT mode has not been selected, the method 100 moves on to block 110, where the maximum vehicle acceleration, Acc_maxPwr that can be achieved via the adjusted or original battery discharge power limit, Pwr_battDischLim, is determined. Please note that an original value of the battery discharge power limit, Pwr_battDischLim, corresponds to a value that was not adjusted at block 108 and an adjusted value of the battery discharge power limit, Pwr_battDischLim, corresponds to a value that was adjusted by the ratio, rt, at block 108. The maximum vehicle acceleration, Acc_maxPwr, is a function of and is derived from auxiliary power (Pwr_aux), vehicle speed (vspd), vehicle mass (veh_mass), and road load. Next, the method 100 moves on to block 112, where the initial pedal acceleration request, Acc_PedalReqPre, is clipped by the maximum vehicle acceleration, Acc_maxPwr, such that a final pedal acceleration request, Acc_PedalReq, will be set as the minimum between the initial pedal acceleration request, Acc_PedalReqPre, and the maximum vehicle acceleration, Acc_maxPwr to make sure the final pedal acceleration request, Acc_PedalReq, cannot go beyond the capability of the battery 22. Next, it is determined again at block 114 if the IAT mode has been selected. If the IAT mode has not been selected, the method 100 moves on to block 116 and where a deliverable vehicle acceleration request, Acc_req, will be set as the final pedal acceleration request, Acc_PedalReq, which is not truncated. Next, the method moves onto block 118, where the controller 32 executes control to operate the battery 22 and the M/G 14 to accelerate the vehicle 10 according to the deliverable vehicle acceleration request, Acc_req.

Returning to block 114 if the IAT mode has been selected, the method 100 moves on to block 120. At block 120 it is determined if the accelerator pedal 34 has been applied at a position that exceeds a first calibratable threshold (e.g., 90%) consistently for a calibrated time or if a rate at which the accelerator pedal is being depressed exceeds a second calibratable threshold. If the answer at block 120 is YES, the method 100 moves on to block 116 where the deliverable vehicle acceleration request, Acc_req, will be set as the final pedal acceleration request, Acc_PedalReq, and then onto block 118 where the controller 32 executes control to operate the battery 22 and the M/G 14 to accelerate the vehicle 10 according to the deliverable vehicle acceleration request, Acc_req.

if the answer at block 120 is NO, the method 100 moves on to block 122 where a desired vehicle acceleration, Acc_desReq, is obtained via an IAT strategy. The desired vehicle acceleration, Acc_desReq, is a truncated acceleration request that is configured to conserve battery power and/or to prevent the vehicle cooling system 42 from transition from one cooling power mode or level to another, which occurs when a temperature of the battery crosses a threshold and which requires additional power from the battery 22 to cool the battery 22. The method 100 then moves on to block 124 where the deliverable vehicle acceleration request, Acc_req, is set as the minimum between the final pedal acceleration request, Acc_PedalReq, and the desired vehicle acceleration, Acc_desReq. The method 100 then moves on to block 118 where the controller 32 executes control to operate the battery 22 and the M/G 14 to accelerate the vehicle 10 according to the deliverable vehicle acceleration request, Acc_req. It should be understood that the flowchart in FIGS. 3A and 3B is for illustrative purposes only and that the method 100 should not be construed as limited to the flowchart in FIGS. 3A and 3B. Some of the steps of the method 100 may be rearranged while others may be omitted entirely.

Figure 4:
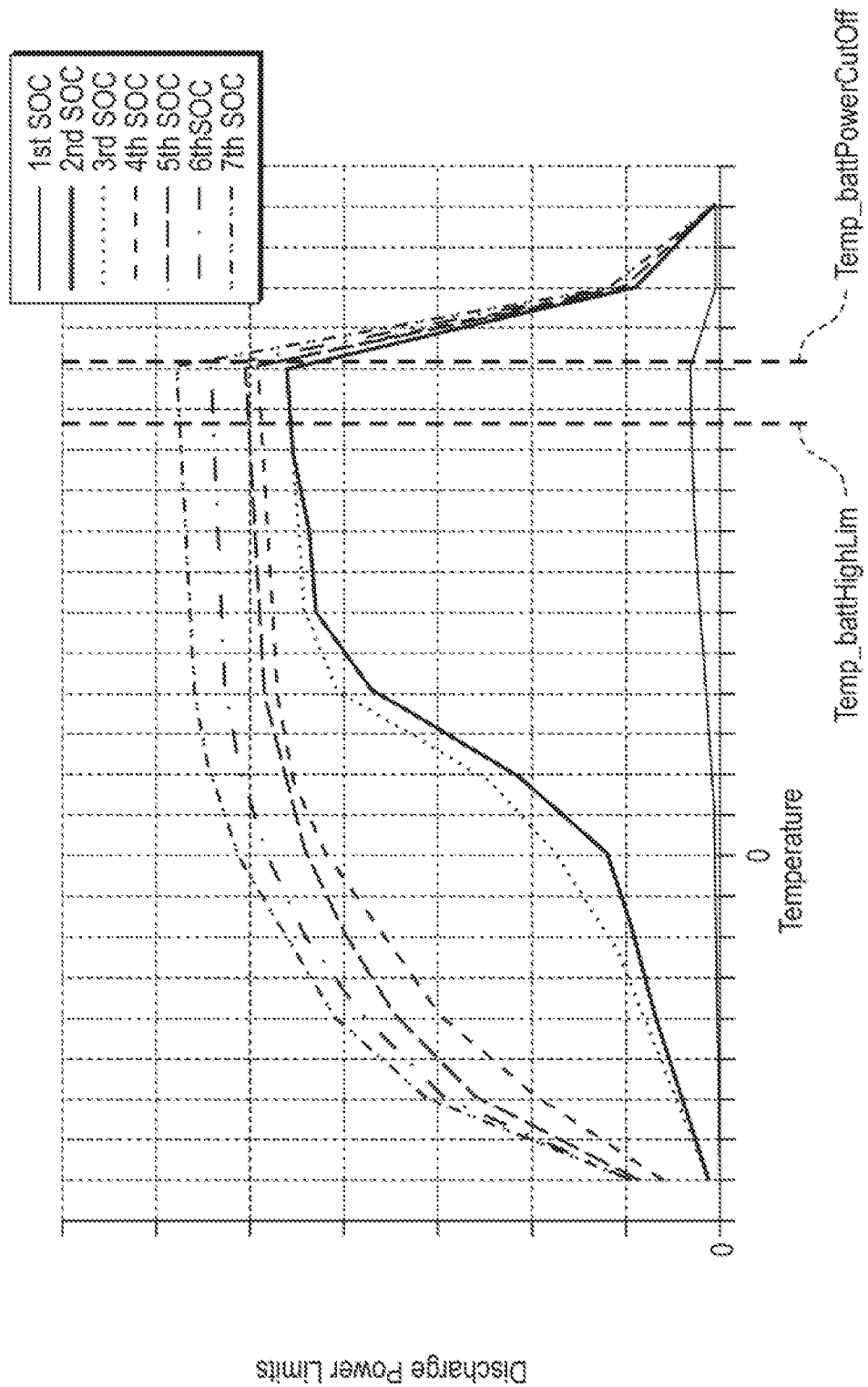
FIG. 4 is a series of graphs illustrating the relationship between discharging power limits of a battery vs. the temperature of the battery.

The effect of reaching the battery power cut off temperature, Temp_battPwrCutOff, is illustrated in FIG. 4. More specifically, FIG. 4 is a series of graphs illustrating the relationship between the discharging power limits of the battery 22 at different states of charge of the battery 22 vs. the temperature of the battery 22. The battery discharge power limits increase as the temperature of the battery 22 increases within certain temperature range. Beyond this certain temperature range, the allowed power output of the battery 22 is cut off very quickly when the temperature of the battery 22 crosses the battery power cut off temperature, Temp_battPwrCutOff. For BEVs, the battery temperature should be kept below Temp_battPwrCutOff to avoid the vehicle powering down on the road due to a sudden loss of battery power capability. In addition, the battery temperature plays an important role for battery life the higher the battery temperature is, the faster the battery degradation becomes. To reduce battery degradation, it is desired to have the battery temperature stay below a preferred battery working temperature, which can be defined as battery working temperature high limit Temp_battHighLim, which is equal to the Temp_battPwrCutOff−Temp_delta, where the Temp_delta is a calibratable positive value. The battery discharge limits described in FIG. 4 may be stored as control limits within the controller 32 for the output power of the battery 22.

The temperature of the battery 22 may be determined by equation (2):

$$\Delta T_{bat} = \frac{1}{\alpha}\left\{\int_0^t I(V_t - OCV(SOC))dt - \int_0^t h(\text{P\_cooling})(T_{bat} - T_{coolant})dt\right\} \quad (2)$$

where SOC is battery State of Charge, $V_1$ is battery pack terminal voltage, OCV is battery open circuit voltage, which is a function of SOC, $T_{bat}$ is battery temperature, and $T_{coolant}$ is coolant temperature of battery cooling system (e.g., the coolant flowing through coolant loop 44); I is battery charge (±)/discharge(−) current flow, which is dependent on vehicle power requirement and SOC; h is battery cooling system heat convection coefficient; P_cooling is the consumed power of the battery cooling system 42, and α is battery heat capacity.

The first term $\int_0^t I(V_t-OCV(SOC))$ dt of equation (1) represents battery heat generated by current flow through battery, which varies at different vehicle speeds and/or vehicle accelerations. The second term $\int_0^t h(\text{P\_cooling})(T_{bat}-T_{coolant})dt$ is the heat energy dissipated by the battery cooling system 42, which is dependent on the consumed power of the battery cooling system, P_cooling.

Figure 5:
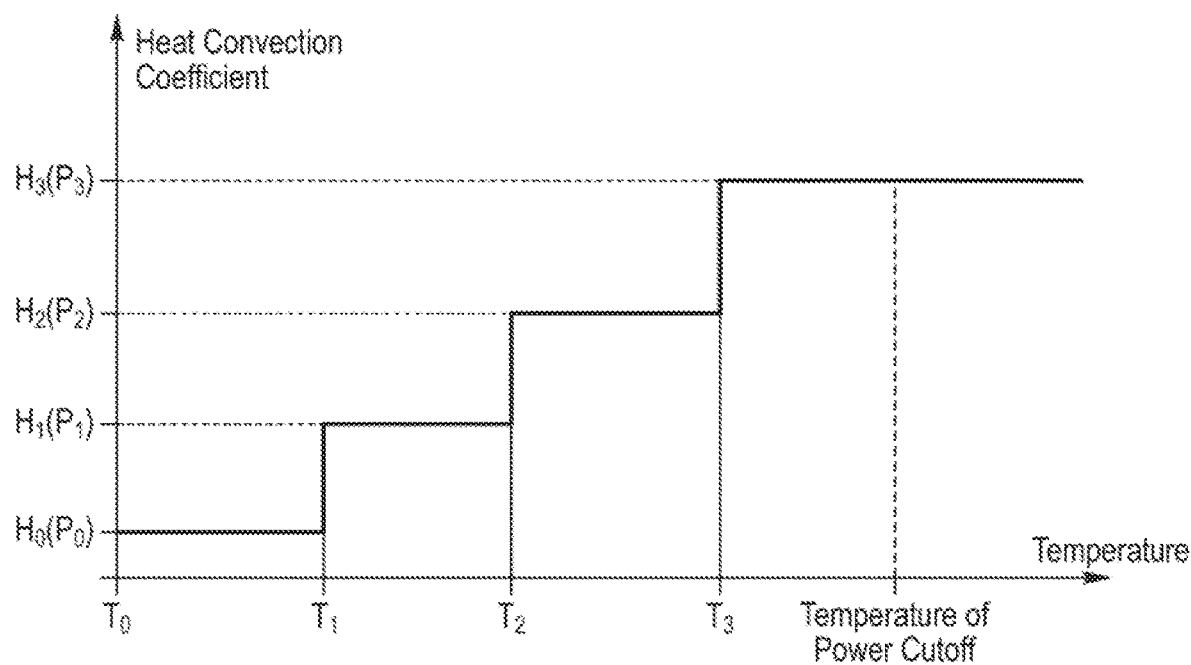
FIG. 5 is a graph illustrating transitions between battery cooling modes or battery cooling levels as the temperature of the battery increases.
Figure 6:
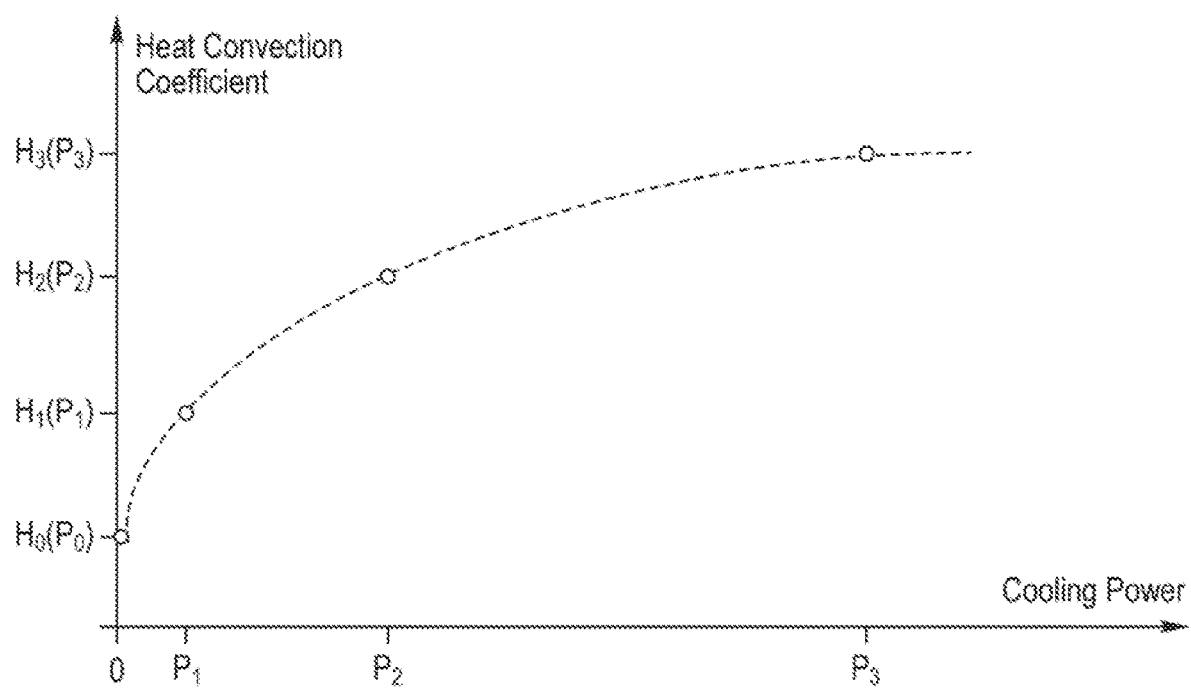
FIG. 6 is a graph illustrating the relationship between heat convection coefficient and the power required to cool the battery.

FIG. 5 is a graph illustrating transitions between battery cooling modes or battery cooling levels of the battery cooling system 42 as the temperature of the battery 22 increases. Several cooling modes are available and are selected based on the temperature of the battery 22. Here we give an example of four cooling modes or levels, with the first mode having heat convection coefficient $H_0(0)$, which corresponds to a natural convection where there is no active control. (e.g., where the pump 50 of the coolant loop 44 and the compressor 52 of the refrigerant loop 46 are both inactive). The second and third modes have heat convection coefficients $H_1(P_1)$, and $H_2(P_2)$, which correspond to operating the battery cooling system 42 at different respective coolant flow speeds (i.e., operating the pump 50 to generate different coolant flow speeds through the coolant loop 44 while the refrigerant loop 46 is inactive). Alternatively, the second and third cooling modes may include increasing the speed of a fan that is configured to cool the coolant within the coolant loop 44. In a system that does not include the refrigerant loop 46, the chiller 48 illustrated in FIG. 2 may be replaced by a heat exchanger, where the coolant within the coolant loop 44 flows through the heat exchanger and the fan directs air across the heat exchanger to cool the coolant within the coolant loop 44. The heat exchanger and fan may also be utilized in addition to the chiller 48 and refrigeration loop 46 as opposed to replacing the chiller 48 and refrigeration loop 46. In yet another alternative, the fan 57 may simply direct air across the battery 22 to cool the battery 22 and the second and third cooling modes may include increasing the speed of the fan 57. The fourth mode has a heat convection coefficient of $H_3(P_3)$, Which corresponds to operating both the coolant loop 44 and the refrigerant loop 46 of the battery cooling system 42 (e.g., both the pump 50 and compressor 52. are being operated). The fourth mode is activated when battery temperature is moving toward the battery power cut off temperature, Temp_battPwrCutOff. The relationship between heat convection coefficient, H, and the consumed power of the battery cooling system, P_cooling, is illustrated in FIG. 6. As shown, a ratio in the increase of the consumed power of the battery cooling system, P_cooling, is greater than a ratio of an increase of heat convection coefficient, H, when the battery cooling system 42 transitions from a lower cooling level or mode to a subsequent cooling level or mode. In order to reduce cooling power consumption, it is desired to have the battery cooling system 42 work at the lowest possible cooling level. It should be understood that any of the values described in FIGS. 5 and 6 may be control parameters that are stored within the controller and may be periodically updated.

In this disclose, IAT strategies are proposed for two purposes. The first purpose is to prevent or delay the temperature of the battery 22 from crossing threshold limits that will require a transition from a current cooling level or mode to a higher cooling level or mode (e.g., to prevent the temperature of the battery 22 from crossing a temperature threshold described in FIG. 5, such as $T_1$, or $T_2$, or $T_3$, that results in the cooling system 42 transitioning to a higher cooling level or mode). Here $T_1$, $T_2$, or $T_3$ may be referred as cooling control level selection threshold temperatures. The second purpose is to prevent the temperature of the battery 22 from becoming higher than the battery power cut off temperature, Temp_battPwrCutOff.

Figure 7:
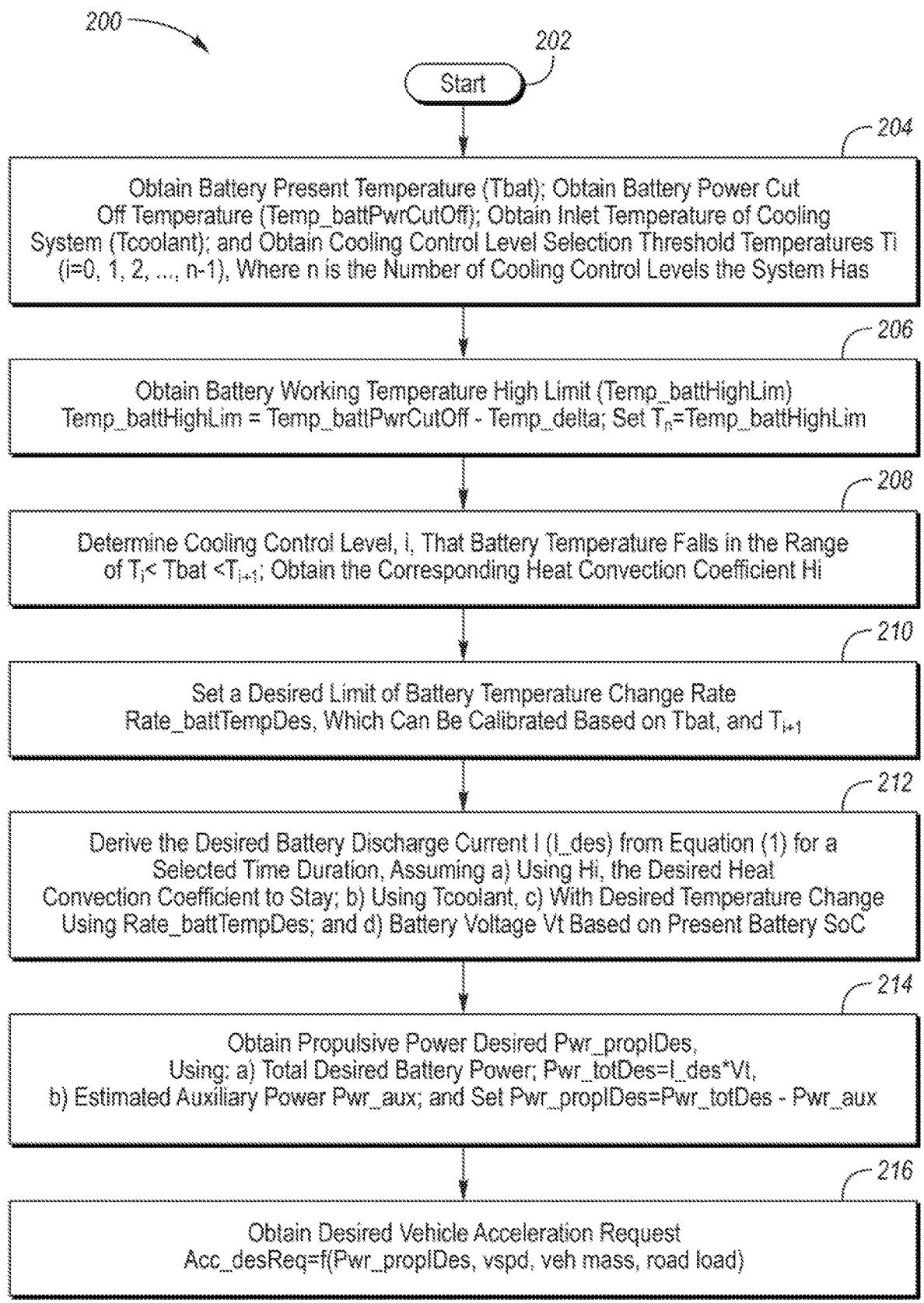
FIG. 7 is a flowchart illustrating a first strategy for truncating the acceleration request.

Referring to FIG. 7, a flowchart illustrating a first strategy for truncating the acceleration request is illustrated. The first strategy may be referred to as the first IAT strategy 200. The first IAT strategy 200 may be utilized to determine or calculate the truncated desired vehicle acceleration, Acc_desReq, which is then input into block 122 of method 100. The first IAT strategy 200 may be stored as control logic and/or an algorithm within the controller 32. The first IAT strategy 200 is initiated at start block 202. Next, the first IAT strategy 200 moves on to block 204 where the following values are obtained: the present temperature of the battery 22, Tbat, the battery power cut off temperature, Temp_battPwtCutOff, the temperature of coolant within the coolant loop 44 of the battery cooling system 42, Tcoolant, and the cooling control level selection threshold temperatures $T_i$ (i=0, 1, 20, . . . , n-1), where n is the number of cooling control levels of the battery cooling system 42.

Next, the first IAT strategy 200 moves on to block 206, where battery working temperature high limit, Temp_battHighLim, is derived, and set as $T_n$, the threshold temperature at the highest cooling level. The first IAT strategy 200 then moves on to block 208 where the current cooling level, i, that the battery cooling system 42 is operating at and the corresponding heat convection coefficient, Hi, are obtained. The first IAT strategy 200 moves on to block 210 where, a desired limit of the temperature change rate, Rate_battTempDes, of the battery 22 is set. The desired limit of the temperature change rate, Rate_battTempDes, may be based on the battery present temperature, Tbat, and the temperature threshold that will initiate a transition of the battery cooling system 42 to the next higher cooling level or mode, $T_{i+1}$, via a calibration table. In order to avoid a transition to such a higher cooling level, the desired limit of the temperature change rate, Rate_battTempDes, may be set to smaller values as the battery present temperature, Tbat, becomes closer to $T_{i+1}$.

Next, the first IAT strategy 200 moves on to block 212 where a desired battery discharge current, I_des, for a selected time duration can be derived using Equation (2), by utilizing the current convection coefficient, Hi, the current temperature of the coolant within the coolant loop 44 of the battery cooling system 42, $T_{coolant}$, the desired limit of the temperature change rate, Rate_battTempDes, and the battery voltage, Vt, based on present battery, SoC. Next, the first IAT strategy 200 moves on to block 214, where the desired propulsive power, Pwr_propDes, which is equal to the difference between the total desired battery power, Pwr_totDes, and estimated auxiliary power, Pwr_aux, is determined or obtained. The first IAT strategy 200 then moves on to block 216 where the desired vehicle acceleration request, Acc_desReq, is determined or obtained. The desired vehicle acceleration request, Acc_desReq, is a function of and may be derived from the desired propulsive power, Pwr_propDes, vehicle speed (vspd), vehicle mass (veh_mass), and road load. The desired vehicle acceleration request, Acc_desReq, is then input into block 122 of method 100 as the truncated acceleration.

The steps outlined in FIG. 7 may be used to calculate an increase in temperature of the battery if the final pedal acceleration request, Acc_PedalReq, is utilized. If it is determined that utilizing the final pedal acceleration request, Acc_PedalReq would result in a battery power and discharge current that would cause the temperature of the battery to exceed, $T_{i+1}$, then the controller 32 will command the truncated desired vehicle acceleration request, Acc_desReq, which will have an associated truncated battery power output and an associated truncated battery discharge current, to prevent the increase in the temperature of the battery 22 from exceeding, $T_{i+1}$, which ultimately prevents a transition of the battery cooling system 42 to the next higher cooling level or mode. It should be understood that the flowchart in FIG. 7 is for illustrative purposes only and that some of the steps may be rearranged while others may be omitted entirely.

Figure 8:
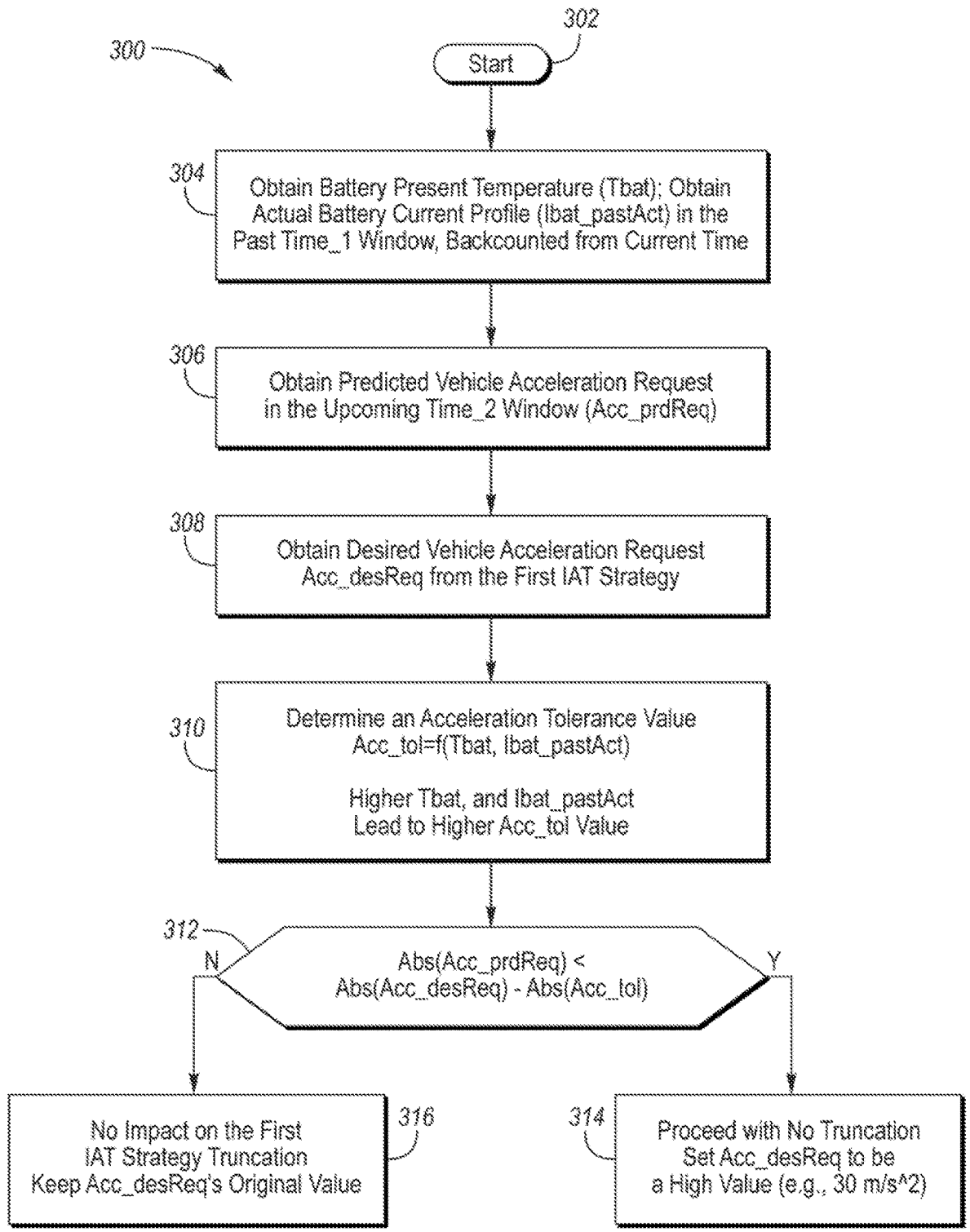
FIG. 8 is a flowchart illustrating a second strategy for truncating the acceleration request.

Referring to FIG. 8, a flowchart illustrating a second strategy for truncating the acceleration request is illustrated. The second strategy may be referred to as the second IAT strategy 300. The second IAT strategy 300 may be utilized to override the truncated desired vehicle acceleration, Acc_desReq, in response to a predicted time window of an upcoming acceleration event. The second IAT strategy 300 considers the necessity of truncating the acceleration request if it is predicted that an upcoming time window will likely involve very mild driving, such a relatively small acceleration request or an acceleration request that will only last for a short period of time. With the advance of V2X (including V2V vehicle to vehicle, V2I vehicle to infrastructure, etc.) technology, obtaining representative vehicle speed and vehicle acceleration predictions in the near short time window from the current time instant is promising. The vehicle's current location, road attributes, real-time traffic information from V2X data, past vehicle driving history, and current time of the day may be utilized to produce a predicted vehicle acceleration request in order to make an acceleration request truncation decision. If the prediction is available, control decisions for the current time instant may be adjusted accordingly.

The second IAT strategy 300 may be stored as control logic and/or an algorithm within the controller 32. The second IAT strategy 300 is initiated at start block 302. Next, second IAT strategy 300 moves on to block 304 Where the present battery temperature, Tbat, and an actual battery power or current, Ibat_pastAct, in a past time window (the time window can be calibrated), that is back-counted from the current time window, are obtained. Next, the second IAT strategy 300 moves on to block 306 and 308 where a predicted vehicle acceleration request, Acc_prdReq, in an upcoming time window (the time window can also be calibrated) and the truncated desired vehicle acceleration request, Acc_desReq, from the first IAT strategy 200 are obtained, respectively. Next, the second IAT strategy 300 moves on to block 310 where an acceleration tolerance, Acc_tol, is determined as a function of the present battery temperature, Tbat, and an actual battery current or power, Ibat_pastAct, which may be stored in a lookup table. Higher present battery temperatures, Tbat, may correspond with higher acceleration tolerances, Acc_tol within the lookup table, and higher currents, Ibat_pastAct in a past time window may correspond with higher acceleration tolerances, Acc_tol, within the lookup table.

Next, the second IAT strategy 300 moves on to block 312 where the absolute value of the predicted vehicle acceleration request, Acc_prdReq, is compared with the absolute value of the truncated desired vehicle acceleration request, Acc_desReq, from the first IAT strategy 200 minus the absolute value of the acceleration tolerance, Acc_tol. This is to check if the upcoming drive is mild, adjusted by the present battery temperature, and potential build-up of the temperature from the latest vehicle driving (there is usually a delay of the temperature build-up from the latest discharge: charge event). If the absolute value of the predicted vehicle acceleration request, Acc_prdReq, is less than the absolute value of the truncated desired vehicle acceleration request, Acc_desReq, minus the absolute value of the acceleration tolerance, Acc_tol, the second IAT strategy 300 moves on to block 314 where the process proceeds without truncation (i.e., any truncation at block 122 of method 100 due to the first IAT strategy 200 at block 122 will be overridden). For example, if such a determination is made, block 314 interacts with method 100 such that no truncation occurs (i.e., the Acc_PedalReq, will be set as the deliverable vehicle acceleration request, Acc_req). If the absolute value of the predicted vehicle acceleration request, Acc_prdReq, is not less than the absolute value of the truncated desired vehicle acceleration request, Acc_desReq, minus the absolute value of the acceleration tolerance, Acc_tol, the second IAT strategy 300 moves on to block 316 where the second IAT strategy 300 does not impact the truncation that may be required by the first IAT strategy 200. It should be understood that the flowchart in FIG. 8 is for illustrative purposes only and that some of the steps may be rearranged while others may be omitted entirely.

A design option for an HMI may be to give the driver a slider bar or set of options (performance, normal, eco, max range) to choose a priority for maximizing range vs. performance. The HMI may also provide feedback to indicate when the system is delivering performance at the expense of EV range. The objective is to enable driver change any range vs. performance selection in real time based on feedback. The control can adjust the acceleration request based on the selection. For example, if x% performance is selected with y% max range, then acceleration blending between Acc_desReq, and Acc_pedalReq can be proceeded, with Acc_req=min((a*Acc_desReq+(1−a)*Acc_pedalReq), Acc_pedalReq), where a=min(f(x,y),1).

It should be understood that the designations of first, second, third, fourth, etc. for thresholds, modes, levels, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
an electric machine configured to propel the vehicle;
a battery configured to provide electrical power to the electric machine;
an accelerator pedal;
a battery cooling system configured to cool the battery in a plurality of cooling modes, wherein a transition from a first cooling mode to a second cooling mode corresponds to an increase in battery power utilized to cool the battery, and wherein a transition from the second cooling mode to the first cooling mode corresponds to a decrease in battery power utilized to cool the battery; and
a controller programmed to,
in response to a temperature of the battery increasing from less than to greater than a first threshold, transition the battery cooling system from the first cooling mode to the second cooling mode,
in response to the temperature of the battery decreasing from greater than to less than the first threshold, transition the battery cooling system from the second cooling mode to the first cooling mode, receive a demanded acceleration request from the accelerator pedal while the battery cooling system is in the first cooling mode, calculate an estimated increase in battery temperature that would result from the demanded acceleration request, and in response to a sum of a current battery temperature and the estimated increase in battery temperature being greater than the first threshold, truncate the demanded acceleration request such that the temperature of the battery remains below the first threshold and the battery cooling system remains in the first cooling mode during acceleration.

2. The vehicle of claim 1, wherein the estimated increase in battery temperature is based on a required discharge current of the battery to accelerate the vehicle according to the demanded acceleration request over a predetermined period of time.

3. The vehicle of claim 2, wherein the controller is programmed to truncate the demanded acceleration request by reducing the discharge current of the battery to less than the required discharge current of the battery to accelerate the vehicle according to the demanded acceleration request over the predetermined period of time.

4. The vehicle of claim 1, wherein the controller is further programmed to, in response to a position of the accelerator pedal exceeding a second threshold, override truncating the demanded acceleration request and accelerate the vehicle according to the demanded acceleration request.

5. The vehicle of claim 1, wherein the controller is further programmed to, in response to a rate at which the accelerator pedal is being depressed exceeding a second threshold, override truncating the demanded acceleration request and accelerate the vehicle according to the demanded acceleration request.

6. The vehicle of claim 1, wherein the battery cooling system includes a coolant circuit that is configured to cool the battery, and wherein the transition of the battery cooling system from the first cooling mode to the second cooling mode includes increasing a rate at which a pump directs coolant through the coolant circuit.

7. The vehicle of claim 1, wherein the battery cooling system includes a coolant circuit that is configured to cool the battery and a refrigerant circuit that is configured to cool the coolant within the coolant circuit, and wherein the transition of the battery cooling system from the first cooling mode to the second cooling mode, includes activating a compressor within the refrigerant circuit.

8. The vehicle of claim 1, wherein the controller is configured to, predict a future acceleration request over a future time window, and in response to, the future acceleration request being less than the truncated acceleration request minus a tolerance, which is determined based on the current battery temperature, and usage of battery current over previous time windows, override truncating the demanded acceleration request and accelerate the vehicle according to the demanded acceleration request.

9. A vehicle comprising:

an electric machine configured to propel the vehicle;

a battery configured to provide electrical power to the electric machine;

an accelerator pedal;

a battery cooling system configured to cool the battery in a first cooling mode and a second cooling mode, wherein a transition from the first cooling mode to the second cooling mode corresponds to an increase in battery power utilized to cool the battery; and a controller programmed to, in response to a temperature of the battery increasing from less than to greater than a first threshold, transition the battery cooling system from the first cooling mode to the second cooling mode, receive a demanded acceleration request from the accelerator pedal while the battery cooling system is in the first cooling mode, calculate a truncated acceleration request to maintain the battery temperature to less than the first threshold to prevent the battery cooling system from transitioning from the first cooling mode to the second cooling mode, in response to the truncated acceleration request being less than the demanded acceleration request, accelerate the vehicle according to the truncated acceleration request, and in response to the demanded acceleration request being less than the truncated acceleration request, accelerate the vehicle according to the demanded acceleration request.

10. The vehicle of claim 9, wherein the controller is further programmed to, in response to a position of the accelerator pedal exceeding a second threshold, override accelerating the vehicle according to the truncated acceleration request and accelerate the vehicle according to the demanded acceleration request.

11. The vehicle of claim 9, wherein the controller is further programmed to, in response to a rate at which the accelerator pedal is being depressed exceeding a second threshold, override accelerating the vehicle according to the truncated acceleration request and accelerate the vehicle according to the demanded acceleration request.

12. The vehicle of claim 9, wherein the battery cooling system includes a coolant circuit and a fan that is configured to direct air across the battery to cool the battery, and wherein the transition of the battery cooling system from the first cooling mode to the second cooling mode includes increasing a speed of the fan.

13. The vehicle of claim 9, wherein the battery cooling system includes a coolant circuit that is configured to cool the battery, and wherein the transition of the battery cooling system from the first cooling mode to the second cooling mode includes increasing a rate at which a pump directs coolant through the coolant circuit.

14. The vehicle of claim 9, wherein the battery cooling system includes a coolant circuit that is configured to cool the battery and a refrigerant circuit that is configured to cool the coolant within the coolant circuit, and wherein the transition of the battery cooling, system from the first cooling mode to the second cooling mode, includes activating a compressor within the refrigerant circuit.

15. The vehicle of claim 9, wherein the controller is configured to, predict a future acceleration request over a future time window, and in response to the future acceleration request being less than the truncated acceleration request minus a tolerance, which is determined based on the current battery temperature, and usage of battery current over previous time windows, override accelerating the, vehicle according to the truncated acceleration request and accelerate the vehicle according to the demanded acceleration request.

16. A vehicle comprising:
an electric machine configured to propel the vehicle;
a battery configured to provide electrical power to the electric machine;
an accelerator pedal;
a battery cooling system having a coolant circuit and pump that is configured to circulate a coolant within the coolant circuit to cool the battery, wherein an increase in pump speed corresponds with an increase in battery cooling and an increasing battery power being utilized to cool the battery; and
a controller programmed to,
  in response to a temperature of the battery increasing from less than to greater than a first threshold, increase pump speed from a first speed to a second speed,
  receive a demanded acceleration request from the accelerator pedal while the temperature of the battery is less than the first threshold and the pump is operating at the first speed,
  calculate an estimated increase in battery temperature that would result from the demanded acceleration request based on a battery power output required to accelerate the vehicle according to the demanded acceleration request, and
  in response to a sum of a current battery temperature and the estimated increase in battery temperature being greater than the first threshold, increase the power output of the battery to less than the battery power output required to accelerate the vehicle according to the demanded acceleration request such that the vehicle accelerates at a value that is less than the demanded acceleration request and such that the temperature of the battery remains below the first threshold and the pump remains operating at the first speed during the acceleration.

17. The vehicle of claim 16, wherein the controller is further programmed to, in response to a position of the accelerator pedal exceeding a second threshold, override accelerating the vehicle according to the truncated acceleration request and accelerate the vehicle according to the demanded acceleration request.

18. The vehicle of claim 16 wherein the controller is further programmed to, in response to a rate at which the accelerator pedal is being depressed exceeding a second threshold, override accelerating the vehicle according to the truncated acceleration request and accelerate the vehicle according to the demanded acceleration request.

19. The vehicle of claim 16, wherein the battery cooling system includes a refrigerant circuit that is configured to cool the coolant within the coolant circuit, and wherein activating a compressor within the refrigerant circuit corresponds with an increase in battery cooling and an increasing battery power being utilized to cool the battery.

20. The vehicle of claim 19, wherein the controller is further programmed to,
  in response to the temperature of the battery increasing from less than to greater than a second threshold, activate the compressor,
  receive a second demanded acceleration request from the accelerator pedal while the temperature of the battery is less than the second threshold,
  calculate a second estimated increase in battery temperature that would result from the second demanded acceleration request based on a battery power output required to accelerate the vehicle according to the second demanded acceleration request, and
  in response to the sum of the current battery temperature and the second estimated increase in battery temperature being greater than the second threshold, increase the power output of the battery to less than the battery power output required to accelerate the vehicle according to the second demanded acceleration request such that the vehicle accelerates at a value that is less than the second demanded acceleration request and such that the temperature of the battery remains below the second threshold and the compressor remains deactivated.

* * * * *